(12) United States Patent
Kushino

(10) Patent No.: US 7,111,718 B2
(45) Date of Patent: Sep. 26, 2006

(54) DRIVING FORCE-TRANSMITTING DEVICE

(75) Inventor: Hiroshi Kushino, Obu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 106 days.

(21) Appl. No.: 10/965,811

(22) Filed: Oct. 18, 2004

(65) Prior Publication Data

US 2005/0109574 A1 May 26, 2005

(30) Foreign Application Priority Data

Oct. 16, 2003 (JP) ............................. 2003-355942

(51) Int. Cl.
*F16D 27/115* (2006.01)
(52) U.S. Cl. ........................ 192/35; 192/84.7
(58) Field of Classification Search ................ 192/84.7
See application file for complete search history.

(56) References Cited

U.S. PATENT DOCUMENTS

| | | | |
|---|---|---|---|
| 2,861,225 A | | 11/1958 | Mergen |
| 2,887,200 A | | 5/1959 | Mergen et al. |
| 2,933,171 A | * | 4/1960 | Kraeplin ..................... 192/84.7 |
| 6,578,684 B1 | * | 6/2003 | Yamamoto et al. ........... 192/35 |
| 6,722,482 B1 | * | 4/2004 | Takuno et al. ................ 192/35 |
| 2002/0079178 A1 | | 6/2002 | Takuno et al. |
| 2004/0134736 A1 | * | 7/2004 | Ando et al. ................... 192/35 |

FOREIGN PATENT DOCUMENTS

| | | | |
|---|---|---|---|
| EP | 1 148 263 A1 | | 10/2001 |
| JP | 04083945 A | * | 3/1992 |
| WO | WO 03/019028 A1 | | 3/2003 |

* cited by examiner

*Primary Examiner*—Richard M. Lorence
(74) *Attorney, Agent, or Firm*—Oblon, Spivak, McClelland, Maier & Neustadt, P.C.

(57) ABSTRACT

A driving force-transmitting device 10 has a housing 11 and 12, an inner shaft 18, a main clutch 22, a pilot clutch 24 and a cam mechanism 23 including a first and second cam members 26 and 25. Plural main outer and inner clutch disks 20 and 21 of the main clutch 22 are respectively spline-engaged with the housing 11 and the inner shaft 18. Plural pilot outer and inner clutch disks 32 and 33 of the pilot clutch 24 are respectively spline-engaged with the housing 11 and the first cam member 26 of the cam mechanism 23. The second cam member 25 of the cam mechanism 23 is arranged to constantly contact one of the main inner clutch disks 21 and is not spline-engaged with spline grooves of the inner shaft 18.

4 Claims, 3 Drawing Sheets

DRIVING FORCE-TRANSMITTING DEVICE

INCORPORATION BY REFERENCE

The present application claims priority under 35 U.S.C. §119 to Japanese Patent Application No. 2003-355942, filed on Oct. 16, 2003. The contents of the application are incorporated herein by references in their entirety.

BACKGROUND OF THE INVENTOIN

1. Field of the Invention

The present invention relates to a driving force-transmitting device of which main clutch is engaged by a cam mechanism amplifying torque through a pilot clutch. Concretely, the driving force-transmitting device is a coupling which distributes driving force to front and rear wheels of an all wheel drive vehicle, or is used for a limited slip differential gear which limits differential rotation between front and rear or right and left wheels of a vehicle.

2. Description of the Related Art

Heretofore, there has been known a driving force-transmitting device for an all wheel drive vehicle such as disclosed in U.S. Patent Application Publication 2002/0079178 A1 corresponding to Japanese Patent Laid Open 2002-188656. The driving force-transmitting device includes a cuplike housing, an inner shaft, a main clutch, a pilot clutch and a cam mechanism. The inner shaft is rotatably bore by the housing in a cylindrical room formed therebetween. In the cylindrical room, there are alternately arranged plural main outer and inner clutch disks of the main clutch. The main outer clutch disks are spline-engaged with the interior circumferential surface of the housing, to be non-rotatable but axially movable relative to the housing. The main inner clutch disks are spline-engaged with the exterior circumferential surface of the inner shaft, to be non-rotatable but axially movable relative to the inner shaft. Next to the main clutch in the cylindrical room, there is arranged the cam mechanism made from a first and second cam members. The second cam member is spline-engaged with the exterior circumferential surface of the inner shaft, to be non-rotatable but axially movable relative to the inner shaft. The first cam member is engaged with the second cam member, to be rotatable and axially movable relative to the second cam member. Between the first cam member and the housing, there are alternately arranged plural pilot outer and inner clutch disks of the pilot clutch. The pilot outer clutch disks are spline-engaged with the interior circumferential surface of the housing, to be non-rotatable but axially movable relative to the housing. The pilot inner clutch disks are spline-engaged with the first cam member, to be non-rotatable but axially movable relative to the first cam member. In such driving force-transmitting device, when pilot torque at the pilot clutch occurs, the cam mechanism generates relative rotational and axial movement between the first and the second cam members. Thus the main clutch is pressurized by the second cam member and transmits torque between the housing and the inner shaft, to be amplified by the cam mechanism.

In the above mentioned driving force-transmitting device, as shown in FIG. 1, the pilot inner clutch disks 101 of the pilot clutch 100 are spline-engaged with the first cam member 102, and the second cam member 104 is spline-engaged with the inner shaft 103 by spline grooves R. When an electromagnet, not shown, generates magnetic force and attracts an armature 105, the pilot torque is transmitted through the pilot clutch 100 from the housing 106 to the first cam member 102. Because of each of the spline-engagements, there occurs the cam action of relative rotational and axial movement between the first and the second cam members 102 and 104. For the cam action, the bottomed spline grooves R are formed on the second cam member 104 in order to engage the inner shaft 103.

However, where the bottomed spline grooves R are formed by cold forging or form rolling, there is formed an incomplete groove portion at each bottom of the spline groove R, so that the incomplete groove portions may bite the inner shaft 103 on the spline grooves. Therefore, the incomplete groove portions should be machined and eliminated after the spline grooves R are formed, or a concavity should be formed at a part of each bottom of the spline groove R, so that there increases the production process of the second cam member 104. There is another method to simultaneously form the second cam member 104 and the spline grooves R by sintering, however sintering costs. Further, the second cam member 104 becomes larger because the spline grooves R exist.

SUMMARY OF THE INVENTION

In view of the previously mentioned circumstances, it is an object of the present invention to resolve the above-mentioned problems to produce the driving force-transmitting device to be able to rotate the cam mechanism relatively, even if there are not formed the spline grooves of the second cam member. The inventors studied and found that the second cam member contacts the main inner clutch disk and the frictional force of such contact makes the first and the second cam members to rotate relatively, when the pilot torque at the pilot clutch generates.

In order to achieve the above object, the present invention provides a driving force-transmitting device comprising:

a main clutch transmitting driving force between a housing and an inner shaft;

a pilot clutch;

a cam mechanism arranged between the both clutches;

wherein a first cam member of the cam mechanism is spline-engaged with pilot inner clutch disks of the pilot clutch and is restricted not to axially move relative to the housing; and wherein a second cam member of the cam mechanism is arranged to constantly contact one of main inner clutch disks of the main clutch and is not spline-engaged with spline grooves of the inner shaft.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENTS

Figure 1:
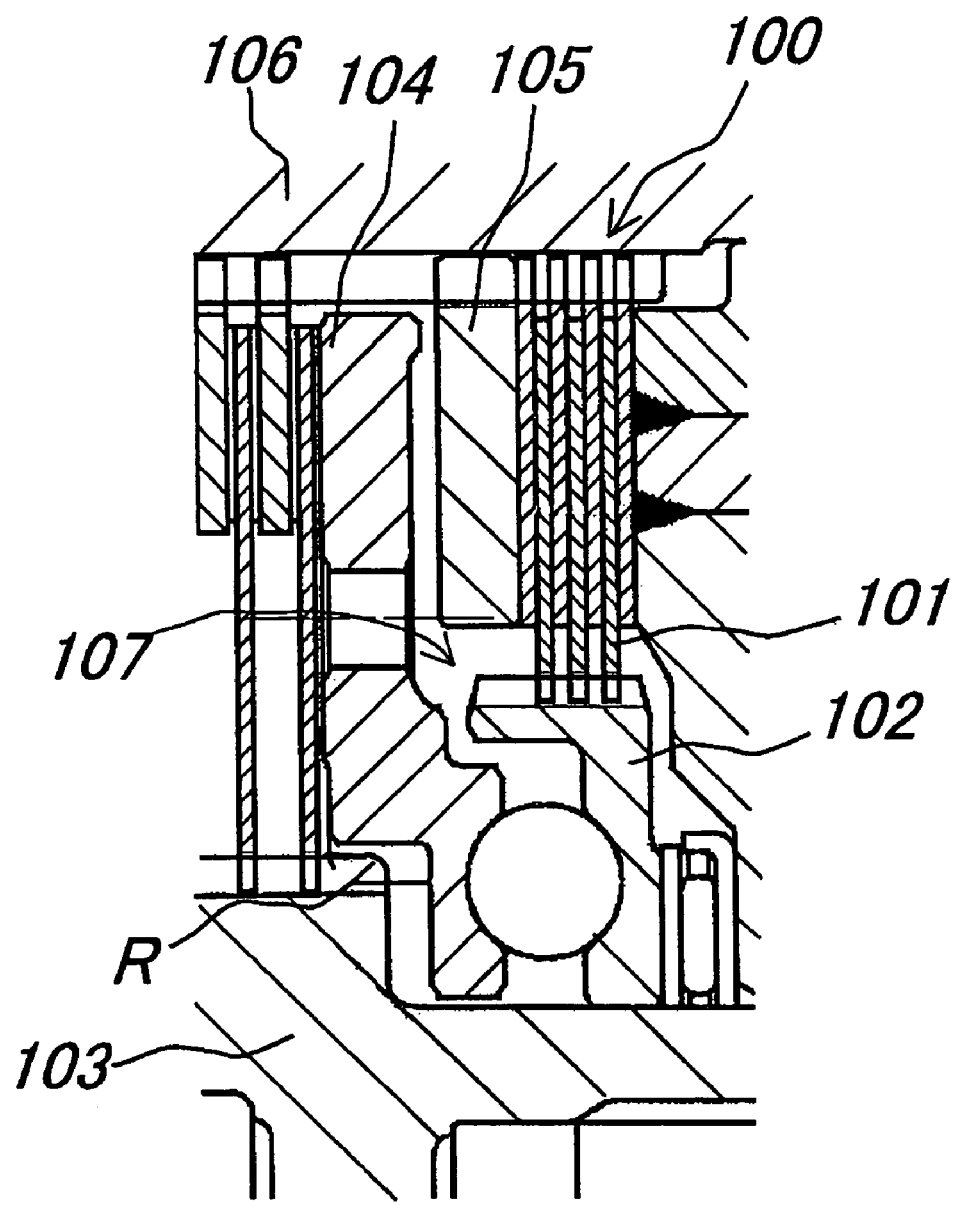
FIG. 1 is an enlarged view of a cam mechanism of a driving force-transmitting device according to the prior art.
Figure 2:
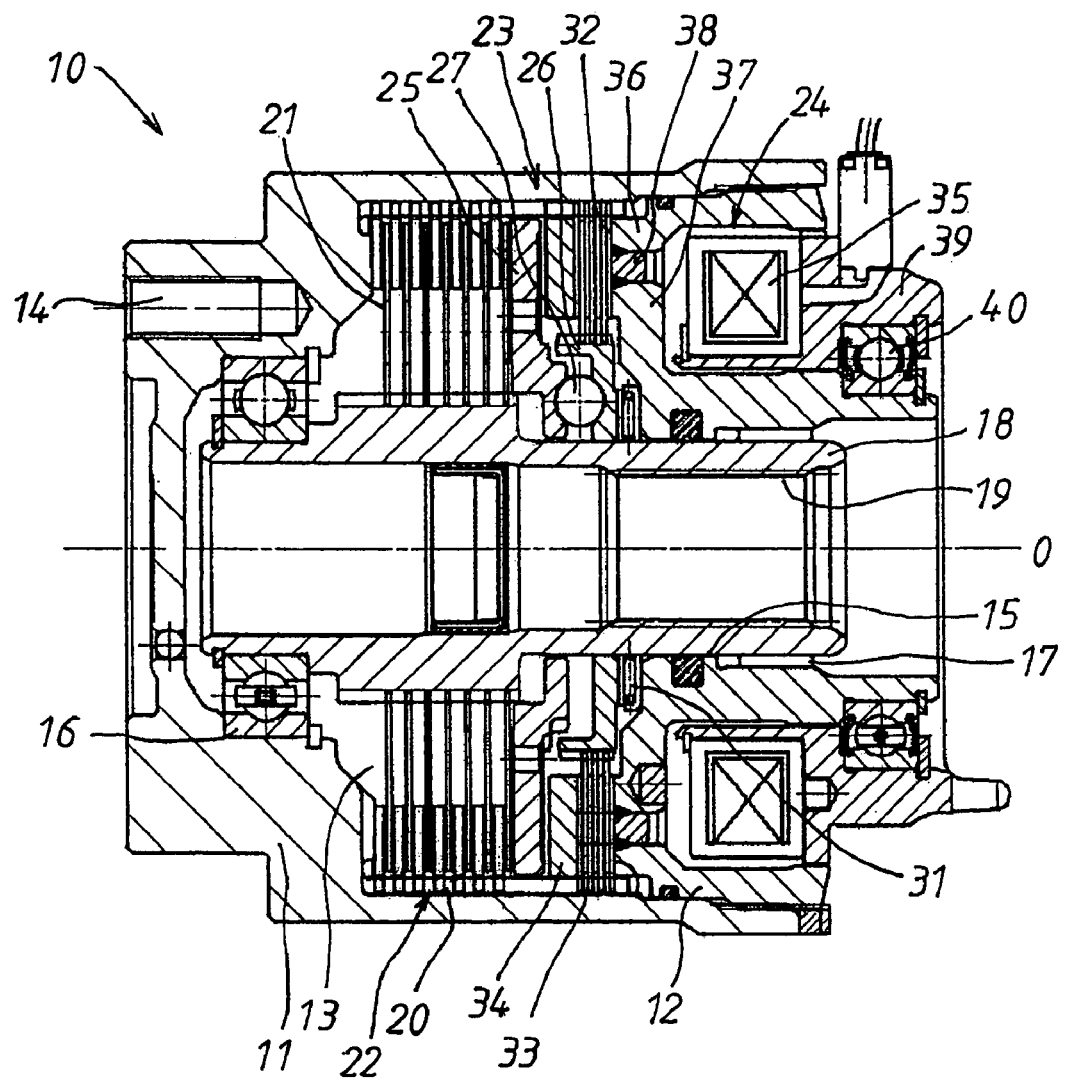
FIG. 2 is a longitudinal section view of a driving force-transmitting device according to an embodiment of the present invention.

A preferred embodiment of a driving force-transmitting device according to the present invention will be described referring to FIGS. 2 and 3. FIG. 2 is a longitudinal section view of an electromagnetic driving force-transmitting device 10 of the embodiment according to the present invention. The electromagnetic driving force-transmitting device 10 is disposed in a drive-line, e.g. a propeller shaft of an on demand type all wheel driving vehicle which is based on a front wheel driving and distributes driving force of an engine to front and rear wheels. A cuplike cylindrical front housing 11 is rotatably carried about rotational axis O by a clutch case (not shown). A rear housing 12 is screwed up to an opening of the front housing 11, thereby a cylindrical clutch room 13 is formed in the front housing 11 to seal up lubricant oil therein. There are made thread-bores 14 on the exterior bottom portion of the front housing 11, to connect with a front propeller shaft. A cylindrical bore 15 penetrates through the center of the rear housing 12. A hollow inner shaft 18 is rotatably supported about the rotational axis O by bearings 16 and 17 which are respectively arranged on a cavity of the interior bottom portion of the front housing 11 and on the bore 15 of the rear housing 12. At the rear end of the interior circumferential surface of the inner shaft 12, there is formed a spline bore 19 to be spline-engaged with a rear propeller shaft.

Figure 3:
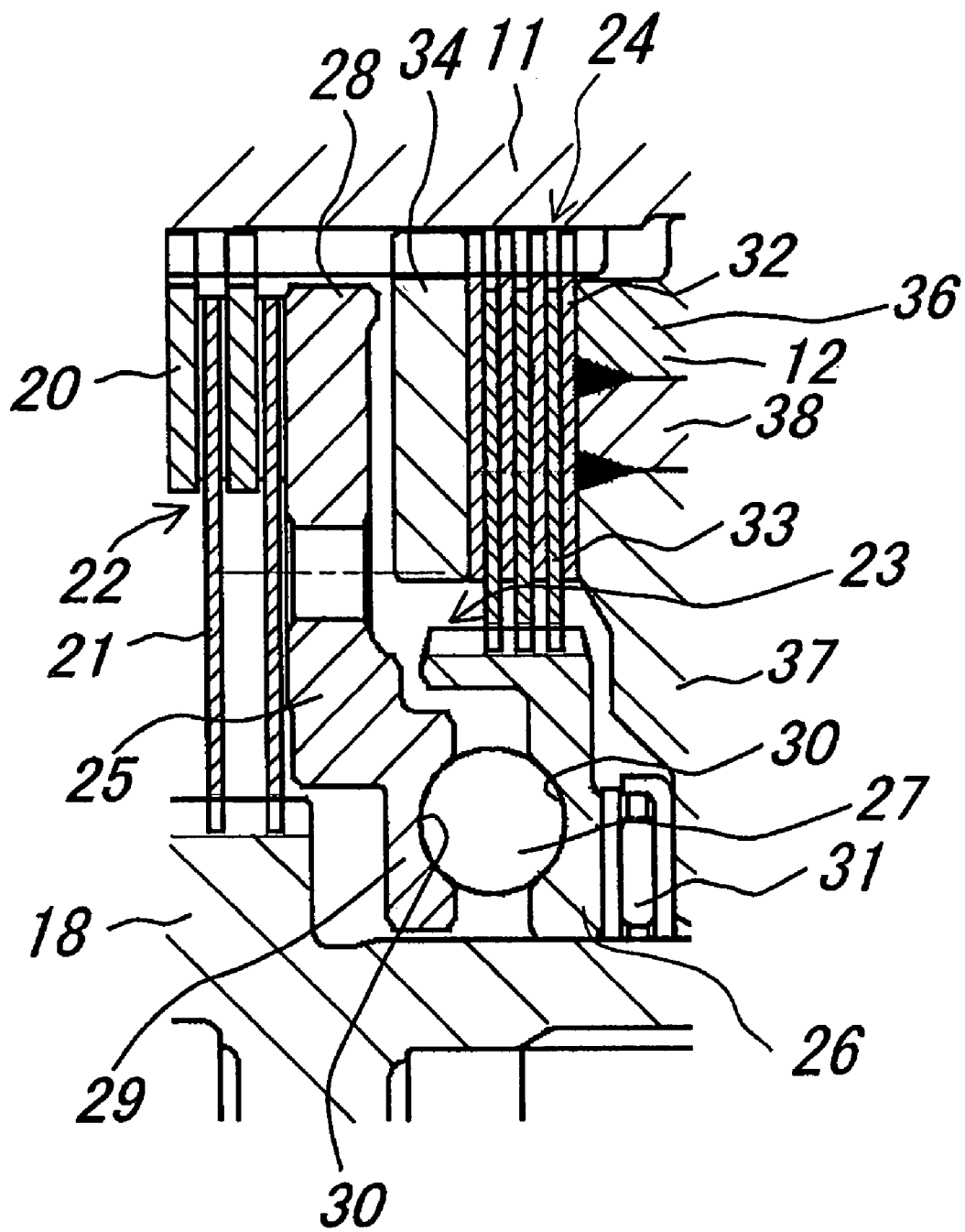
FIG. 3 is an enlarged view of a cam mechanism of the driving force-transmitting device according to the embodiment.

In the cylindrical clutch room 13, as shown in FIG. 3, there is arranged a main clutch 22 including plural main outer clutch disks 20 and main inner clutch disks 21. The main outer clutch disks 20 are made from iron and are spline-engaged with the interior circumferential surface of the clutch room 13, to be non-rotatable relative to the front housing 11 but axially movable along the rotational axis O. Each of the main inner clutch disks 21 comprises an iron core pasted frictional material thereon and are spline-engaged with the exterior circumferential surface of the middle of the inner shaft 18, to be non-rotatable relative to the inner shaft 18 but axially movable along the rotational axis O. There are alternately arranged plural main outer and inner clutch disks 20 and 21, to be able to engage and release each other.

Between the main clutch 22 and the rear housing 12 in the clutch room 13, there are arranged a cam mechanism 23 and a pilot clutch 24. The cam mechanism 23 includes a first cam member 26, a second cam member 25 and plural balllike cam followers 27. The second cam member 25 is made from a thrust portion 28 of a large-diameter disk part and a cam portion 29 of a small-diameter disk part. The thrust portion 28 contacts with one of the main inner clutch disks 21. The cam portion 29 is supported by the inner shaft 18, to be rotatable relative to the inner shaft 18 and axially movable along the rotational axis O. Because the second cam member 25 is a simple shape made from the large and small-diameter disk parts, it is able to be formed by cold forging. Plural cam grooves 30 are formed on the surfaces of the cam portion 29 of the second cam member 25 and the first cam member 26 facing each other, and each of the cam grooves 30 has two ramps in the rotational direction. The cam followers 27 are disposed between the cam grooves 30 and are fitted thereinto. The first cam member 26 loosely fits on the inner shaft 18 and is rotatably supported by the rear housing 12 through a needle bearing 31. The pilot clutch 24 is arranged around the circumference of the first cam member 26.

The pilot clutch 24 includes plural pilot outer clutch disks 32 and plural pilot inner clutch disks 33. The pilot outer clutch disks 32 are spline-engaged with the interior circumferential surface of the clutch room 13, to be non-rotatable relative to the front housing 11 but axially movable along the rotational axis O. The pilot inner clutch disks 33 are alternately arranged with the pilot outer clutch disks 32 and are spline-engaged with the exterior circumferential surface of the first cam member 26, to be non-rotatable relative to the first cam member 26 but axially movable along the rotational axis O.

Between the thrust portion 28 of the second cam member 25 and the pilot clutch 24, there is arranged a disklike armature 34. The armature 34 is spline-engaged with the interior circumferential surface of the clutch room 13, to be non-rotatable relative to the front housing 11 but axially movable along the rotational axis O. There is arranged an electromagnet 35 behind the rear housing 12 at the outside of the front and rear housings 11 and 12. The pilot clutch 24 is controlled by the electromagnet 35 of which magnetic flux attracts the armature 34 to press the pilot outer clutch disks 32 and the pilot inner clutch disks 33. So, the friction force of the pilot clutch 24 is able to be controlled by the electric current flowing through the electromagnet 35.

The rear housing 12 is attached to the front housing 11 to cover its opening behind one of the pilot outer clutch disks 32 (right side of FIGS. 2 and 3). The rear housing 12 is made from a magnetic metal of a large-diameter rear housing portion 36, a magnetic metal of a small-diameter rear housing portion 37 and a non-magnetic metal of an intermediate rear housing portion 38. The large-diameter portion 36 is cylindrical and is screwed up into the opening of the front housing 11. When assembling, the torque screwing the rear housing 12 into the front housing 11 is adjusted. The torque screwing into is preset to generate preferable pressure force of the second cam member 25 onto the main inner clutch disk 21, and imposes restrictions on the axial movement of the first cam member 26. Then, the rear housing 12 is welded to the front housing 11 to be non-rotatable relatively.

The small-diameter rear housing portion 37 forms penetrated cylinder and its interior circumferential surface, the bore 15, forms a stepped portion which is rotatably bore by the inner shaft 18 through a bearing 17. One lateral surface of the first cam member 26 is rotatably bore by the small-diameter rear housing portion 37 through the needle bearing 31. There exists the intermediate rear housing portion 38 between the interior circumferential surface of the large-diameter rear housing portion 36 and the exterior circumferential surface of the small-diameter rear housing portion 37. The intermediate rear housing portion 38 is bonded therebetween, e.g. by welding. The rear housing 12 screwed up into the front housing 11 and presses the needle bearing 31 onto the cam mechanism 23 of which second cam member 25 presses the main inner clutch disk 21. Then, the main clutch 22 is preloaded.

Refer to FIG. 2, the electromagnet 35 is ringlike and is electrically connected via terminals. The electromagnet 35 is enclosed by the rear housing 12 (the large-diameter, small-diameter and intermediate rear housing portions 36, 37 and 38) and is secured to a yoke 39 thereat. The yoke 39 is rotatably bore by the exterior circumferential surface of the small-diameter rear housing portion 37 through a bearing 40 with narrow gaps relative to the large and small-diameter rear housing portions 36 and 37. The yoke 39 is kept engaged with a pin (not shown) protruding from the rear end surface of the clutch case (not shown). In such way, the large and small-diameter rear housing portions 36 and 37, each made from the magnetic metal, are integrally joined at their front ends to the intermediate rear housing portion 38, made from the non-magnetic metal, so that the rear housing 12 constitutes a magnetic path forming member.

Hereinafter, the operation of the electromagnetic driving force-transmitting device 10 will be described. When the engine is started, the driving force of the engine is transmitted to the primary wheels of the front wheels and to the front housing 11 through the front propeller shaft. If the electromagnet 35 is not electrically connected, the magnetic flux is not generated so that the pilot outer and inner clutch disks 32 and 33 are not engaged. In this time, the second cam member 25 is located at the nearest position to the first cam member 26 and contacts with one of the main inner main clutch disk 21 at the thrust portion 28 according to the preload by means of screwing the rear housing 12 up into the front housing 11. Thus, the main inner clutch disks 21 are frictionally engaged with the main outer clutch disks 20 according to the preload, so that little driving force is transmitted to the secondary wheels of the rear wheels through the rear propeller shaft. However, since such transmitted driving force is little, the vehicle substantially runs by only front wheels.

On the other hand, when the electromagnet 35 is electrically connected, the looplike magnetic flux is generated around the section of the electromagnet 35. In proportion to the electric current through the electromagnet 35, the armature 34 is attracted to the rear housing 12 and the pilot outer clutch disks 32 are frictionally engaged with the pilot inner clutch disks 33. Thus, the torque (rotational force) controlled by the electromagnet 35 is transmitted to the first cam member 26 from the front housing 11 through the pilot clutch 24. As a result, there occurs relative differential rotation between the first cam member 26 and the second cam member 25 frictionally contacted and rotated with the main inner clutch disk 21, so that each of the cam followers 27 runs up the ramp of the cam groove 30. That widens out the gap between the first and the second cam members 26 and 25, and the second cam member 25 axially moves to the main clutch 22. Further, the thrust portion 28 of the second cam member 25 presses the main outer and inner clutch disks 20 and 21 of the main clutch 22. Therefore, there is transmitted the torque which is amplified by the cam mechanism 23 and is controlled by small electric current through the electromagnet 35 to the inner shaft 18, and is further transmitted to the rear propeller shaft, the differential gear and the secondary wheels of the rear wheels.

As described above, according to the embodiment, the second cam member 25 constantly contacts with the main inner clutch disk 21 and is supported by the inner shaft 18. And, the first cam member 26 is restricted not to axially move relative to the rear housing 12 by the restriction means. Therefore, the frictional force is generated between the second cam member 25 and the main inner clutch disk 21. When the pilot clutch 24 is operated, the torque is transmitted from the front housing 11 to the first cam member 26 through the pilot clutch 24. Thus, the first cam members 26 rotates relative to the second cam member 25 which is spline-engaged with the inner shaft 18, so that the second cam member 25 axially moves and presses the main inner clutch disk 21. Then, the main outer and inner clutch disks 20 and 21 are frictionally engaged, and the torque is transmitted from the front housing 11 to the inner shaft 18. Such driving force-transmitting device 10 does not need the spline grooves of the second cam member 25, so that the second cam member 25 can be easily made, downsized and lightened.

Further, according to the embodiment, the restriction means is the torque screwing up the rear housing 12 into the front housing 11. Therefore, there can be easily adjusted the position of the first cam member 26 and the thrust force of the second cam member 25 onto the main inner clutch disk 21, even if there exists the dimensional/assembling error of each of the parts. As the restriction means, another member, e.g. a spring, can be used.

Furthermore, according to the embodiment, since the second cam member 25 is cold-forged, the second cam member 25 can be formed less costly than sintering.

What is claimed is:

1. A driving force-transmitting device comprising:
   a main clutch transmitting driving force between a housing and an inner shaft;
   a pilot clutch;
   a cam mechanism arranged between said both clutches;
   wherein a first cam member of said cam mechanism is spline-engaged with pilot inner clutch disks of said pilot clutch and is restricted not to axially move relative to said housing; and
   wherein a second cam member of said cam mechanism is arranged to constantly contact one of main inner clutch disks of said main clutch and is not spline-engaged with spline grooves of said inner shaft.

2. A driving force-transmitting device according to claim 1:
   wherein said housing is made from a cuplike front housing and a rear housing covering the opening of said front housing; and
   wherein said rear housing is screwed into said front housing to restrict said first cam member.

3. A driving force-transmitting device according to claim 1 wherein said second cam member is cold forged.

4. A driving force-transmitting device according to claim 2 wherein said second cam member is cold forged.

* * * * *